(12) United States Patent
Vijendra et al.

(10) Patent No.: US 8,203,965 B1
(45) Date of Patent: Jun. 19, 2012

(54) LAYERED APPROACH FOR REPRESENTING AND ANALYZING VIRTUAL PRIVATE NETWORK SERVICES

(75) Inventors: Sudhir Vijendra, White Plains, NY (US); Patricia Florissi, Briarcliff Manor, NY (US)

(73) Assignee: EMC Corporation, Hopkinton, MA (US)

( * ) Notice: Subject to any disclaimer, the term of this patent is extended or adjusted under 35 U.S.C. 154(b) by 219 days.

(21) Appl. No.: 11/731,696

(22) Filed: Mar. 29, 2007

(51) Int. Cl.
*H04L 12/28* (2006.01)

(52) U.S. Cl. ........ 370/254; 370/397; 370/398; 370/399; 370/469

(58) Field of Classification Search .......... None
See application file for complete search history.

(56) References Cited

U.S. PATENT DOCUMENTS

| | | | | |
|---|---|---|---|---|
| 5,414,812 A | * | 5/1995 | Filip et al. | 707/694 |
| 5,903,568 A | * | 5/1999 | Tanaka et al. | 370/469 |
| 5,938,733 A | * | 8/1999 | Heimsoth et al. | 709/230 |
| 2002/0186664 A1 | * | 12/2002 | Gibson et al. | 370/254 |
| 2004/0218535 A1 | * | 11/2004 | Liong et al. | 370/238 |
| 2004/0230681 A1 | * | 11/2004 | Strassner et al. | 709/226 |
| 2005/0071130 A1 | * | 3/2005 | Benjamin et al. | 702/188 |

* cited by examiner

*Primary Examiner* — Jae Y Lee
(74) *Attorney, Agent, or Firm* — Krishnendu Gupta; Joseph D'Angelo

(57) ABSTRACT

A method, apparatus and computer-program product for logically representing and analyzing a Virtual Private Network (VPN) in a plurality of functional representation layers is disclosed. The method, which is typical of the invention, comprises the steps of representing selected physical and logical components of said VPN as a plurality of configuration non-specific objects determined for each said functional representation layers, organizing selected ones of said objects within selected ones of said functional representation layers, wherein said object are selected from the group consisting of: VPNService, ServiceConnectionPath, ForwarderEndpoint, TunnelGroup, Tunnel, TunnelHop, TunnelIn/Out, SignalingProtocolEndpoint, SignalingProtocolSession and SignalingProtocolService, representing relationships among said physical and logical components as configuration non-specific representations within and among said functional representation layers, wherein Endpoint objects provide communication among said functional representation layers, which are among a group of Service, Service connection, Transport and Protocol layers.

33 Claims, 17 Drawing Sheets

| Service P2P Status |
|---|
| - Up<br>- Down<br>- Testing<br>- Dormant<br>- Incomplete |

| Service VPLS Status |
|---|
| - Up<br>- Down<br>- Impared<br>- Testing<br>- Dormant<br>- Incomplete |

| S-ConnectionPath Status |
|---|
| - Up<br>- Down<br>- Testing<br>- Dormant<br>- Incomplete<br>- Impared |

Tools for detection and trace/localization (for all layers):
- LSP Ping
- VCCV-Ping
- VCCV-BFD
- LDP Status TLV
- ATM Native OAM Cells (F4/F5)
- FR Native OAM (FRF.19)
- LDP Hello
- RSVP_TE Hello
- SNMP/MIB for thresholds State Values:
Down - PW signaling is not finished or not passing packets on the data path
Testing - Admin status is set for testing
Incomplete - Some components are missing
Dormant - The required resources are occupied by higher priority PW
Impared - The QoS/SLA of the service are depreciated
L2-network-fault - A defect has occurred in the L2 access network
Core-network-fault - A defect has occurred in the L2/L3 core network

FIG. 5A

| S-LinkConnection EP Status |
|---|
| -Up<br>-notForwarding<br>-Tx-fault<br>-Rx-fault<br>-Service-Fault<br>  -Atm-fault<br>  -Fr-fault<br>  -Ethernet-fault |

| S-LinkConnection Status |
|---|
| -Up<br>-Down<br>-Admin-down<br>-Impaired<br>-Incomplete<br>-Rx-fault<br>-NativeService-fault<br>  -Atm-fault<br>  -Fr-fault<br>  -Ethernet-fault |

| AC Status |
|---|
| -Tx-fault<br>-Rx-fault<br>-Admin-down<br>-L2-network-fault<br>-NativeService-fault<br>  -Atm-fault<br>  -Fr-fault<br>  -Ethernet-fault |

| Forwarder Status |
|---|
| -Up<br>-down<br>-Max-nr-of-entries-fault<br>-NSP-fault |

FIG. 5B

| TunnelPath Status | TunnelGroup Status | CrossCOnnectTable Status |
|---|---|---|
| -Up<br>-Tx-fault<br>-Rx-fault<br>-Down<br>-Admin-down<br>-LSP-fault<br>-LSP-label-merging fault<br>-Packet-loss-fault | -Up<br>-Impaired<br>-Down<br>-Admin-down | -Up<br>-down<br>-Label error |

FIG. 5C

CONTROL PLANE STATUS

| SignalingProtocol EndPoint Status |
|---|
| -Up<br>-Down<br>-Admin-down |

| SignalingProtocol Status |
|---|
| -Up<br>-down |

| LDP Adjacency Status |
|---|
| -Up<br>-down |

FIG. 5D

| Class | Impact / Problem | L2VPN | VPLS | Comments |
|---|---|---|---|---|
| Service Connection Path | Down | Down | Impaired \| Down | Impaired: If exists a least a subset of VPN_EP with full mesh of service Connection Paths |
| | Impaired | Impaired | Impaired | |
| | Dormant | Dormant | | |
| | Incomplete | Incomplete | Incomplete | The signaling is not complete or some components are transit to operational state up |
| | Testing | | | |
| VPN-EP | Down | Impaired/Down | Impaired \| Down | |
| | Impaired | Impaired | Impaired | |

FIG. 6A

| ServiceConstruct Layer | Problem / Impact | S-LinkConnection Status | S-ConnectionPath Status | S-Connection Status | Comments |
|---|---|---|---|---|---|
| AC-status | Tx-fault | | Down | | Multiple AC are supported by the same physical media |
| | Rx-fault | | Down | | |
| | NetworkNativeService-fault | | Impaired | | QoS/SLA are affected |
| | notPresent | | Incomplete | | Signaling is still in process |
| | Admin-down | | Impaired | | S-COnnectionPath is admin down if all the components are admin-down |
| S-LinkConnection EP-status | notForwarding | Down | | | |
| | Tx-fault | Down | | | |
| | Rx-fault | Down | | | |
| S-LinkConnection status | Down | | Down | | |
| | NotForwarding | | Down | | Down-at least if one S-LinkConnection status is down |
| | Incomplete | | Incomplete | | |
| | NativeStatus-fault | | Impaired | | |
| Forwarder | Down | NotForwarding | | | |
| | Max-nr-of-entries fault | Impaired | | | |
| | NSP-fault | Impaired | | | |
| | notPresent | Incomplete | | | |

FIG. 6B

| Transport Layer | Impact / Problem | Tunnel Group Status | S-LinkConnection Status |
|---|---|---|---|
| TunnelPath | Tx-fault | Up \|Impaired\| Down | |
| | Rx-fault | Up \|Impaired\| Down | |
| | Down | Up \|Impaired\| Down | |
| | notPresent | | |
| | Admin-down | | |
| CrossCOnnectTable | NotForwarding | Up\Down | |
| | Tx-fault | Up\| Down | |
| | Rx-fault | Up\Down | |
| Tunnel Group | Down | | Down |
| | | | |

FIG. 6C

| Control Layer | Impact / Problem | Signalling Protocol Status | S-LinkConnection Status | TunnelPath Status | LDP TLV Status | | |
|---|---|---|---|---|---|---|---|
| SignalingEP status | Down | Down | | | | | |
| | Admin-down | Down | | | | | |
| LDP Adjacency status | Down | Down | | | | | |
| | Admin-down | Admin-down | | | | | |
| LDP Status TLV | down | | NotForwarding | | | | |
| | Timer expired | | NotForwarding | | | | |
| Signalling Protocol Status | Down | | Down? | Down? | Down | | |
| | | | | | | | |

FIG. 6D

| Class | Problem | Impact / AC | TunnelPath | |
|---|---|---|---|---|
| Physical Layer | ifDown | Down | Impaired \| Down | Impaired: If exists a least a subset of VPN_EP with full mesh of Service Connection Paths |
| | LOS | Tx-fault \| Rx-fault | Tx-fault \| Rx0fault | |
| | LOF | Tx-fault \| Rx-fault | Tx-fault \| Rx0fault | |
| | L2-network-fault | Down | | |
| | Core-network-fault | | Down | |

FIG. 6E

LAYERED APPROACH FOR REPRESENTING AND ANALYZING VIRTUAL PRIVATE NETWORK SERVICES

RELATED APPLICATIONS

This application is related to commonly-owned, co-pending patent application entitled "Method and Apparatus for Horizontal and Vertical Modeled Representation and Analysis of Distributed Systems," filed in the US Patent and Trademark Office on Mar. 21, 2007 and afforded Ser. No. 11/726,326, the contents of which are incorporated by reference herein.

FIELD OF THE INVENTION

The invention relates generally to distributed systems, and more specifically to apparatus and methods for modeling and analyzing Virtual Private Network (VPN) Services.

BACKGROUND OF THE INVENTION

Network modeling has proven to be an asset in determining or predicting the characteristics of the network in response to one or more stimuli. Generally, the model incorporates the attributes and parameters of network elements and, in some cases, the relationships among the network elements. For example, commonly-owned U.S. patent Ser. No. 11/494,250, and U.S. Pat. Nos. 5,528,516; 5,661,668; 6,249,755; 6,868,367; 7,003,433 and 7,107,185, the contents of which are incorporated by reference herein, describes methods and systems of network modeling utilizing network attributes, parameters and their relationships. The aforementioned patents and patent applications further describe methods for performing system analysis based on a mapping of observable events and detectable events, e.g., symptoms and problems, respectively, in IP-based networks.

Present methods of modeling networks are typically designed for a particular network type or network protocol. For example, U.S. application Ser. No. 11/176,982, entitled "Method and Apparatus for Analyzing and Problem Reporting in Storage Area Networks," filed on Jul. 8, 2005, describes methods of modeling storage area networks and performing a system analysis on the modeled network, U.S. application Ser. No. 11/325,108, entitled "Method and Apparatus for Analyzing and Problem Reporting in RFID Networks," filed on Jan. 6, 2006, describes methods of modeling RFID networks and performing a system analysis on the modeled network and U.S. application Ser. No. 10/949,415, entitled "Method and Apparatus for Modeling and Analyzing of MPLS and Virtual Private Networks," filed on Sep. 24, 2006, describes methods of modeling MPLS and Virtual Private Network (VPN) and performing a system analysis on the modeled network. In addition, U.S. patent application Ser. No. 11/211,234, entitled "Method and Apparatus for Configuration and Analysis of Network Routing Protocols," filed on Aug. 25, 2005, describes methods for modeling and analyzing network routing protocols. The aforementioned patent applications are commonly-owned by the assignee of the instant invention and their contents are incorporated by reference herein.

With current modeling technology, however, the constructed models are designed specifically for the network or protocol being modeled. These specifically constructed models however limit the ability of the model to be used in different applications and further requires additional efforts to update and maintain the models as new features are added that may be common to all the models or specific to one individual model.

In the aforementioned related U.S. patent application, Ser. No. 11/726,326, a new modeling technology is disclosed. The method in summary provides for modeling systems in layers wherein objects are monitored within layers (intra-layer or horizontal) and the results of intra-layer or horizontal monitoring are provide to higher layer (inter-layer or vertical). This new methodology is adaptable to a plurality of networks or distributed systems and overcomes the limitations of the current technology.

Hence, there is a need in the industry for a method and apparatus for application of a new modeling methodology to Virtual Private Networks (VPNs) to allow for greater flexibility in modeling and analyzing problems detected in such VPNs.

SUMMARY OF THE INVENTION

A method, apparatus and computer-program product for logically representing and analyzing a Virtual Private Network (VPN) in a plurality of functional representation layers is disclosed. The method, which is typical of the invention, comprises the steps of representing selected physical and logical components of said VPN as a plurality of configuration non-specific objects determined for each said functional representation layers, organizing selected ones of said objects within selected ones of said functional representation layers, wherein said objects are selected from the group consisting of: VPNService, ServiceConnectionPath, ForwarderEndpoint, TunnelGroup, Tunnel, TunnelHop, TunnelIn/Out, SignalingProtocolEndpoint, SignalingProtocolSession and SignalingProtocolService, representing relationships among said physical and logical components as configuration non-specific representations within and among said functional representation layers, wherein Endpoint objects provide communication among said functional representation layers, which are among a group of Service, Service connection, Transport and Protocol layers.

DETAILED DESCRIPTION OF THE FIGURES

FIGS. 5A-5D illustrate exemplary attributes of the model elements shown in the conceptual layers shown in FIG. 2;

FIGS. 6A-6E illustrate exemplary system analysis for the conceptual layers shown in FIG. 2.

It is to be understood that these drawings are solely for purposes of illustrating the concepts of the invention and are not intended as a definition of the limits of the invention. The embodiments shown in the figures herein and described in the accompanying detailed description are to be used as illustrative embodiments and should not be construed as the only manner of practicing the invention. Also, the same reference

DETAILED DESCRIPTION

Figure 1:
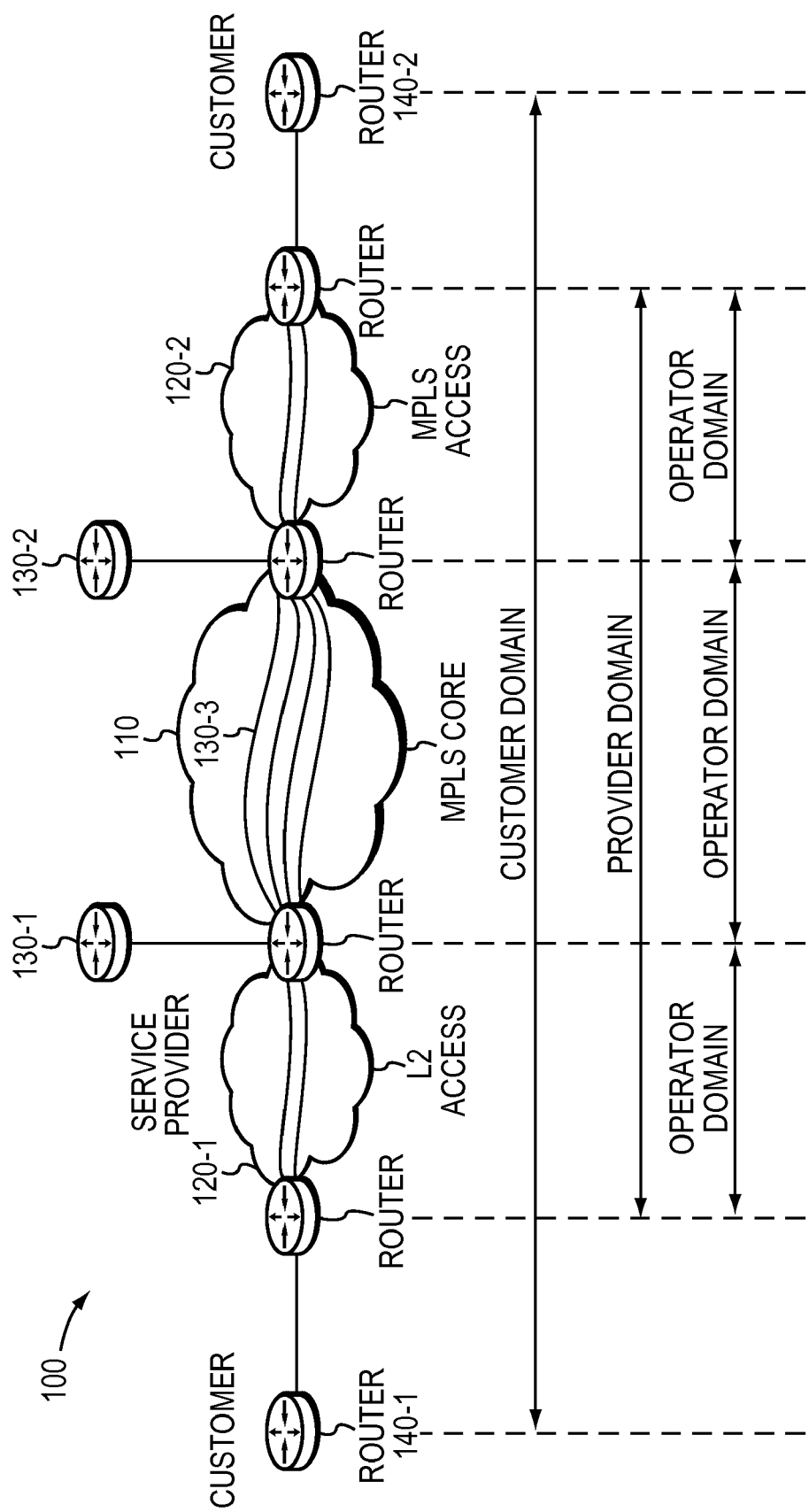
FIG. 1 illustrates conventional MPLS Virtual Private Network.

FIG. 1 illustrates an exemplary conventional Virtual Private Network (VPN) 100 utilizing a MPLS protocol. In this exemplary network the core network 110 represents a public network such as the internet. Access to the core network may be through a service provider network 120-1, 120-2 that allows customers 140-1, 140-2 to privately communicate through core network 110 using a tunnel 140-3. The service provider network 120-1, 120-2, may include codes or encryption that enables the users to communicate privately through network 110. In another aspect, users 130-1, 130-2 may also access the core network 110 directly and communicate privately through tunnel 130-3. In this case, the users 130-1, 130-2 may provide the codes or encryption to provide private communications.

For example, a Multiple Packet Label Switching protocol may be utilized to allow for private communication between users (whether 140-1, 140-2 or 130-1, 130-2). In this case, header information is added to each data packet to be transmitted. The header information includes information regarding the input port of a next router hop within the network and the receiving router determines the output port and identifies the next router through which the data is to pass. MPLS is only one protocol used for creating VPNs. Other protocols VPLS (Virtual Private Label Switching), WVPS and PW (Psuedo-Words). While the invention presented herein is described with regard to MPLS, it would be recognized that the principles of the invention described are also suitable for other protocols used for creating privacy tunnels through a network.

Figure 2:
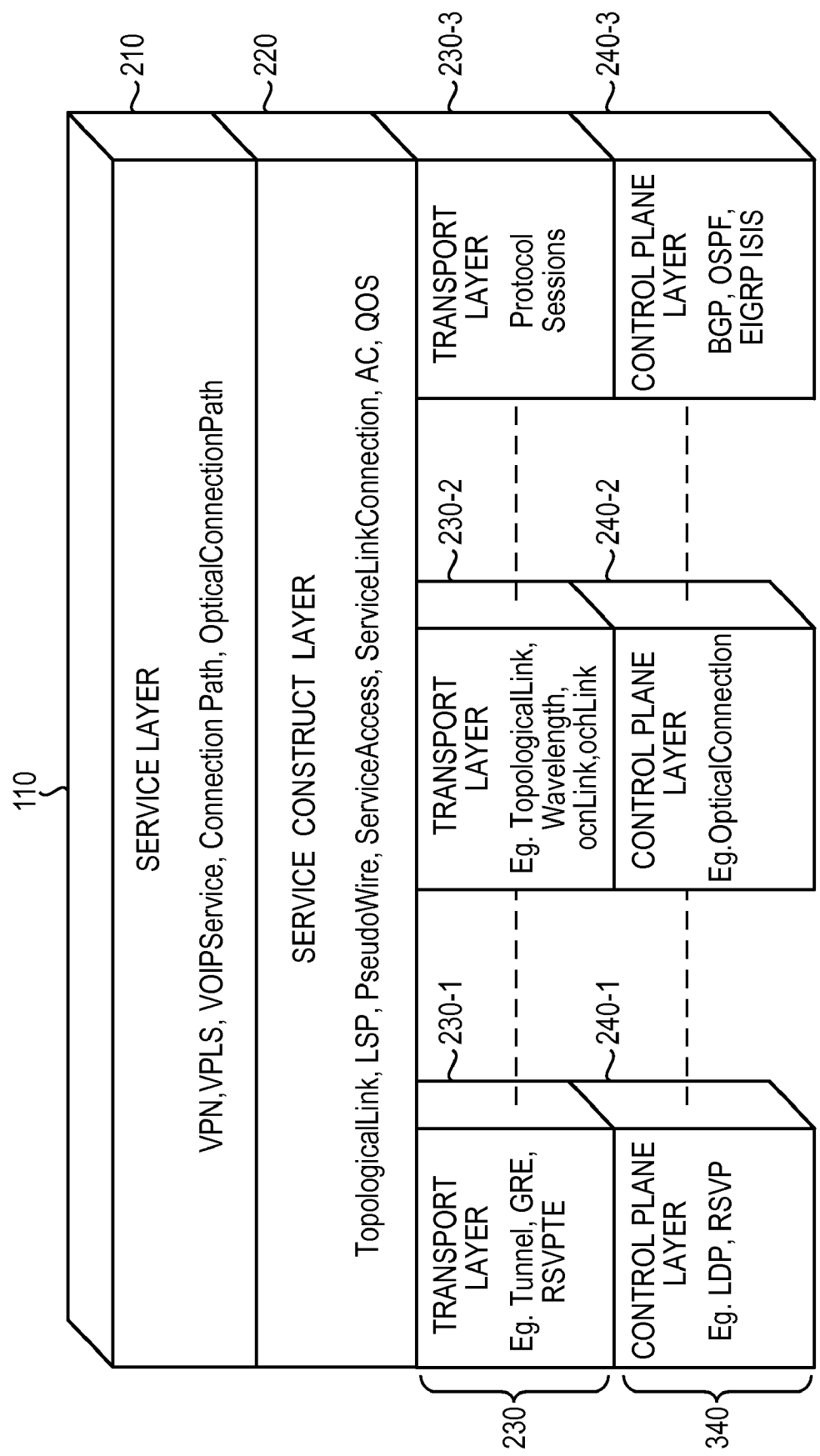
FIG. 2 illustrates a block diagram of a construction of models in accordance with the principles of the invention.

FIG. 2 illustrates a block diagram of an exemplary conceptual VPN model in accordance with the principles of the invention. In this illustrative block diagram, the functionality of the elements of the VPN are separated into layers; Service Layer 210, Service Construct Layer 220, Transport Layer 230 and Control Plane Layer 240, which are more fully described in the aforementioned related patent application Ser. No. 11/726,326. The Service Layer 210 represents the service functions that are to be performed over the VPN. For example, the service may be a VoIP (Voice over IP) service. This service may be achieved by using a VPLS protocol over an optical connection. The Service Construct Layer 220 represents the factors associated with the service, e.g., Quality of Service (QoS). The Transport Layer 230 represents the logical elements used to construct the VPN. The Transport Layer may consider elements such as the tunnel configuration 230-1, or the wavelengths used in the optical connection 230-2 and the protocol sessions that are established 230-3. The Control Plane Layer associates the physical elements of the network with the corresponding logical element in the Transport Layer 230.

The model concept utilized for the VPN provides for the maintenance of a higher level service function without the need of having knowledge of the underlying elements. That is, an exemplary VoIP service shown in Service Layer 210 may be performed whether the underlying transmission medium layer is an optical, a wireless or an electrical communication link.

Figure 3:
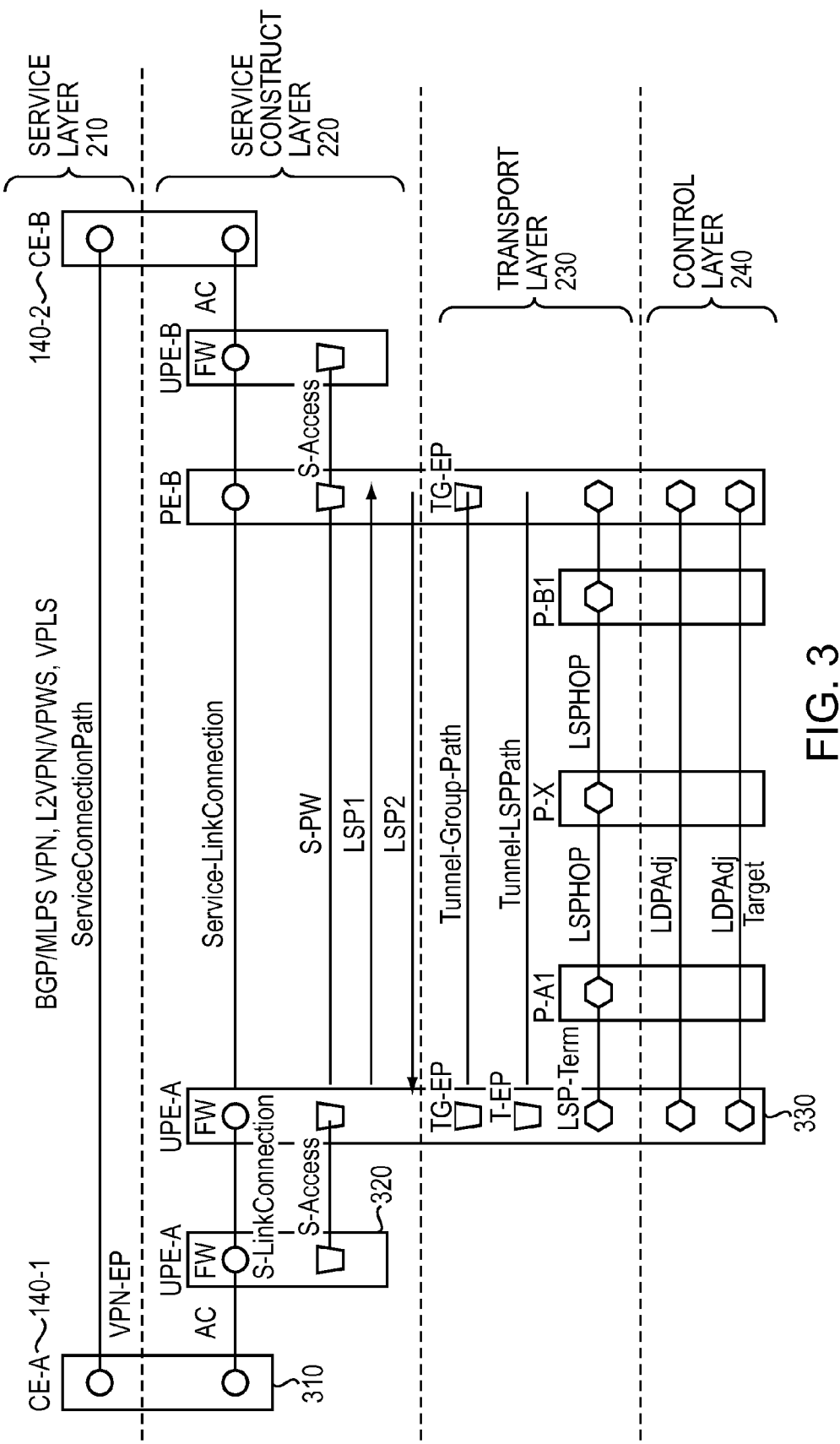
FIG. 3 illustrates exemplary relationships among the conceptual layers shown in FIG. 2 associated with a VPN in accordance with the principles of the invention.

FIG. 3 illustrates exemplary model and relationships of the VPN shown in FIG. 1 represented by the conceptual model shown in FIG. 2, in accordance with the principles of the invention. More specifically, FIG. 3 represents the horizontal and vertical relationships associated with a conventional VPN. In this illustrated case a service, e.g., VoIP (Voice over IP) between customers CE-A 140-1 and CE-B 140-2 is represented as a service connection path (horizontal relationship) contained in the Service Layer 210 of the model shown in FIG. 2. The service may utilize protocols such as BGP/MPLS, L2VPN/VPWS, and VPLS, which are well-known and need not be described in detail herein.

A vertical relationship between the customer CE-A 140-1 at the service layer 210 and the Service Provider router (see FIG. 1) of the service connection layer 220 is represented by the vertical transition 310. Vertical transition 310 graphically represents a logical transport means to transfer information from one layer to another.

At the Service Connection layer 220, the CE-A 140-1 possesses a horizontal Attachment Connection (AC) relationship to the Service Provider router (UPE-A) which further possesses a horizontal S-LinkConnection relationship to the Provider Edge router (PE-A). Referring to FIG. 1, the Service Provider router (UPE-A) represents the router at the customer edge of the Service provider network 120-1 and Provider Edge router (PE-A) represents the router at the edge between the Service Provider network 120-1 and the MPLS core network 110. The routers typically include a mechanism for forwarding (FW) received packets on to a next router. For example, forwarding mechanism may be performed at an OSI stack layer 2 level using a MAC table and/or a static map table. Similarly, the forwarding mechanism may be performed at an OSI stack layer 3 level using a forwarding table containing IP addresses. In this illustrative case, the horizontal relationships between edge routers PE-A and PE-B logically represent the logical and physical connections within the core MPLS network 110. For example, the horizontal relationship S-PW represents the pathway at the service-link connect layer and the Label Switched Paths (LSP 1, LSP 2) represent the paths used to communicate between the two edge routers, PE-A and PE-B (i.e., within the illustrated layer). The vertical transition 330 graphically represents a logical transport means to transfer information from the underlying Transport Layer 230 and Control Layer 240 to the higher service-link connection layer (i.e., among the layers).

At the Transport Layer 230, a logical TunnelGroupPath and Tunnel-LSP-Path relationship objects are shown. The Tunnel-LSP-Path object represents those router-to-router (hop-to-hop) transitions that define a specific path for which there is limited access. The path represents a tunnel through the network with access only at the beginning and the end of the tunnel. That is, a packet can be transmitted via a specific hop by hop path from PE-A to PE-B. The hop by hop path is typically done by encapsulating the packet inside the OSI layer 3 header with the final destination PE-B address. When label switching is used, the tunnel formed is referred to as an LSPTunnel. Although the invention, is described with regard to LSPTunnels, it would be recognized that other such tunnels could be developed utilizing other types of protocols. TunnelGroupPath represents a plurality of tunnels that are assigned or associated with the same users. Information regarding these logical entities is vertically provided to a higher layer through vertical relationships expressed by their respective endpoints TG-EP and T-EP. Also illustrated at the Transport Layer 230 are representative individual routers within the MPLS Core network, which are related via a LSPHOP relationship from one edge router to the other (i.e., PE-A to PE-B). As would be recognized, PE-A represents one of the routers in the path and possesses a LSPHOP relationship to the next router in the path. The combination of the individual routers may be represented by the Tunnel-Group Path.

Similarly at the Control Layer 240, each of the routers is connected by a logical (e.g. protocol) or physical (optical, wire, wireless) connection represented by the LDPAdj relationship. The LDPAdj relationship represents the behavioral connection between two elements, wherein Label Switch Routers (LSRs) exchange labels using Label Distribution Protocol (LDP). The target LDP adjacency is the path from the initial LSR source to the destination. This is made up of multiple LDP adjacencies. RSVP protocol, for example, could also be used at this layer to support MPLS traffic engineering known as RSVP-TE.

Figure 4A:
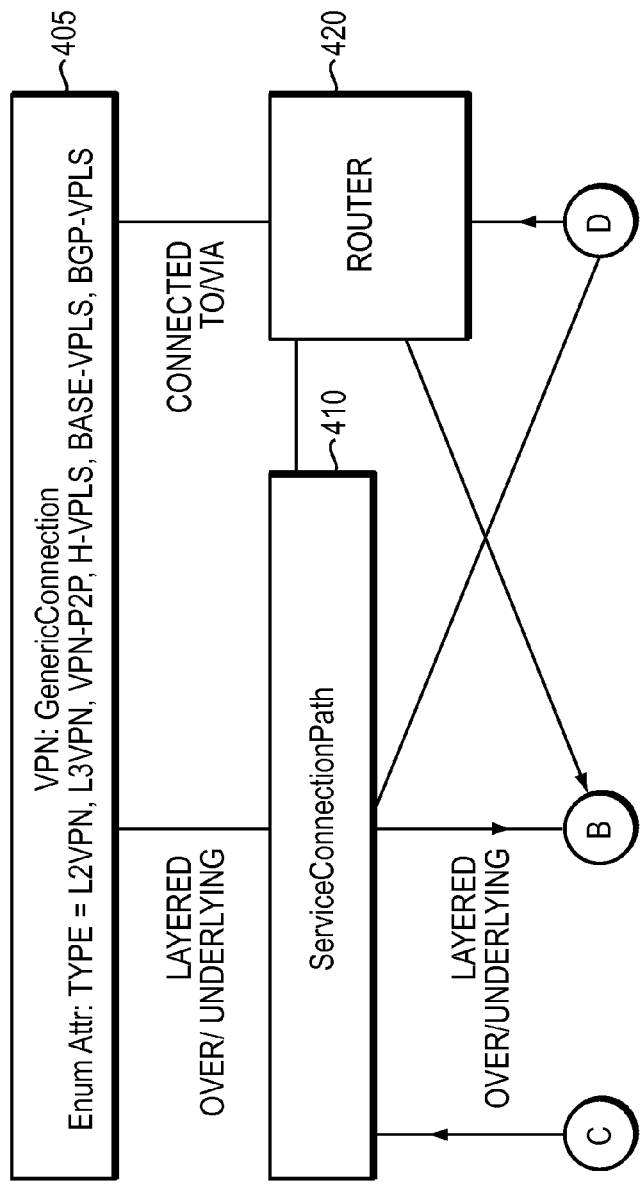
FIGS. 4A-4D illustrate exemplary models of the conceptual layers shown in FIG. 2 in accordance with the principles of the invention.

FIGS. 4A-4D illustrate exemplary models or representations of the conceptual layers shown in FIG. 2 in accordance with the principles of the invention. FIG. 4A illustrates an exemplary model or representation of a Service Layer 210 (FIG. 2) associated with a VPN service. In this illustrated model representation, a GenericConnection object (VPN:GenericConnection) 405 represents VPN services, such as, L2VPN (level 2 VPN), L3VPN (level 3 VPN), VPN-P2P (VPN Point to Point), H-VPLS, Base-VPLS, BGP-VPN (Boundary Gate Protocol VPN), etc. In this case, level 2 and level 3 refer to the well-known seven (7) levels of the OSI (Open Source Interface) stack and need not be discussed in detail herein. Similarly, BGP and the other protocols are well-known network protocol and need not be discussed in further detail herein.

The VPN:GenericConnection possesses a layered-over relationship with a ServiceConnectionPath object 410, and Router object 420. Concepts associated with objects referred-to as GenericConnection and GenericConnectionEndpoint herein are more fully explained with regard to the aforementioned related patent application Ser. No. 11/726,326, the contents of which are incorporated by reference herein. In this case, the object VPN:GenericConnection represents accumulated modeled aspects of a VPN network, at this level or layer. The connection objects, referred to as B, C and D, represent objects through which the Service Layer communicates, and interacts, with lower layers. For example, the ServiceConnectionPath object possesses vertical relationships with the ServiceConstruct Layer 220 (FIG. 2) through connection objects B and C. Router 420 possesses a vertical relationship to the ServiceConstruct Layer 220 through object D. It would be recognized that while the objects are representative of components or elements (physical or logical) of a VPN, these objects do not represent a particular configuration of a VPN. Similarly, the relationship between or among objects is not dependent upon a particular or specific VPN configuration.

Figure 4B:
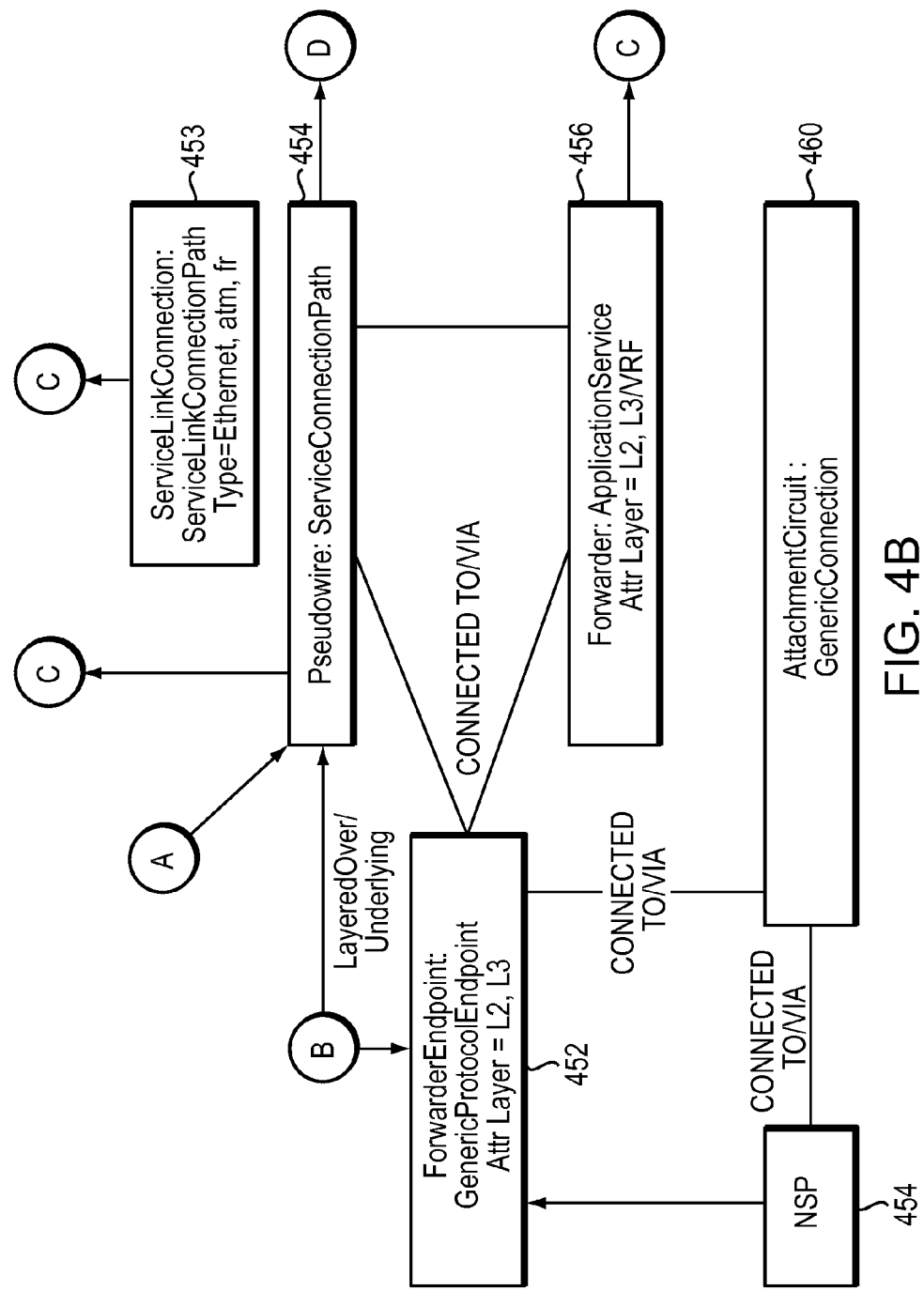

FIG. 4B illustrates an exemplary model representation of a Service Construct Layer 220 (FIG. 2) associated with the VPN ServiceConnectPath object 410 (FIG. 4A). In this example, the ForwardEndpoint object 452 receives information from the ServiceConnectionPath object 410 (FIG. 4A) and provides information, through Pseudowire object 454 to ServiceConnectionPath object. The ForwardEndpoint object 452 further provides information to the ServiceConnectionPath object through the Forwarder Application Service 456.

Figure 4C:
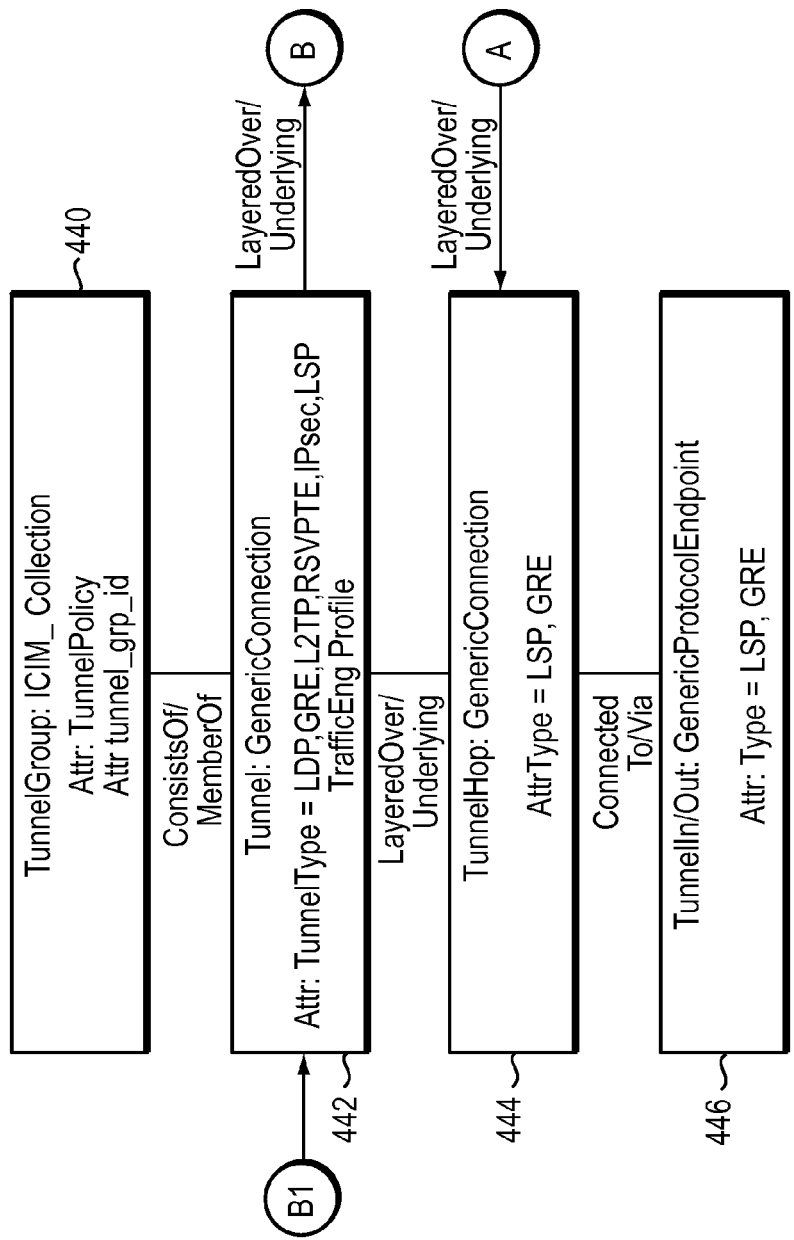

FIG. 4C illustrates an exemplary model representation of a Transport Layer 230 (FIG. 2) associated with the VPN service. In this illustrated case, the tunnels are represented by a Tunnel object which is layered-over a TunnelHop object. The Tunnel and TunnelHop objects are GenericConnection objects, as presented in the aforementioned related patent application. The TunnelHop object is connected to a TunnelIn/Out object, which represents a GenericProtocolEndpoint, similar to that described in the aforementioned related patent application. Connection bubbles A, B and B1 represent the means for providing information from the illustrated Transport Layer to higher and lower layers.

Figure 4D:
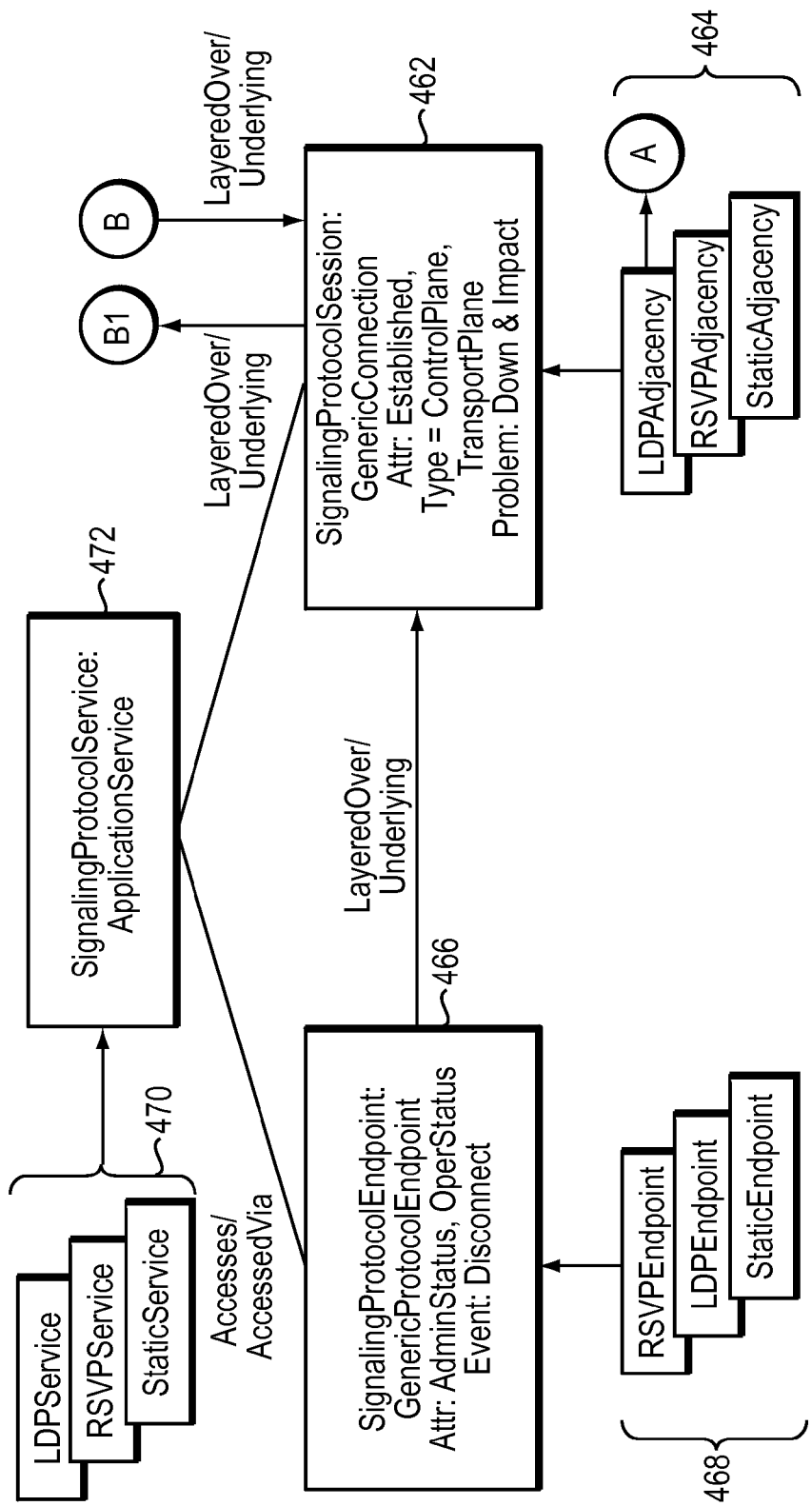

FIG. 4D illustrates an exemplary model representation of a Control Plane Layer 240 (FIG. 2) and particularly the signal protocols 240-3 associated with the VPN ServiceConnectPath object 410 (FIG. 4A). In this illustrated case, the SignalProtocolService object 472 is related to SignalingProtocolEndpoint 466 and SignalingProtocolSession 462 objects. The SignalProtocolService may represent a LDP service, an RSVP service and/or a Static Service. The SignalProtocolSession object represents the session that is established between the elements of the VPN (i.e., the routers and/or switches that constitute the path through the network). The SignalingProtocolEndpoint object 466 may represent an endpoint comparable to the service (LSP, RSVP, and/or Static). Similarly the SignalProtocolSession object 462 may represent an LDPAdjacency, RSVPAdjacency and/or StaticAdjacency objects.

FIGS. 5A-5D represent attributes and status of selected ones of the objects shown in FIG. 3. For example, with reference to FIG. 5A, element or object "S-ConnectionPath Status" illustrates the attributes (Up, Down, Testing, Dormant, Incomplete, Impaired, for example) associated with connection path of the selected service at the Service Layer 210 (FIG. 2). Similarly, with reference to FIG. 5B, the S-LinkConnectionStatus object contains attributes associated with the connection path at the Service Connection Layer 220. FIGS. 5C and 5D illustrate objects and associated attributes at the Transport Layer 230 and Control Layer 240.

FIGS. 6A-6D illustrate impact analysis diagrams for each of the model layers (Service, Service Connection Transport and Control Plane). FIG. 6E further illustrates an impact analysis at the Physical Layer. The Physical Layer, although not shown or referred to previously, represents the physical elements comprising the underlying network and is contained within the Control Plane Layer 240.

An example of the propagation of an error or fault (impact) both horizontally and vertically can be seen with regard to a fault in a Signaling Protocol. With reference to FIG. 6D if a Signaling Protocol status is indicated to be "Down," then the S-LinkConnection Status and TunnelPath Status are impacted and their status is also indicated to be "Down." Referring to FIG. 6C, at the Transport Layer, when the Tunnel Group is indicated to be "Down," then the higher level "S-LinkConnection" status is indicated as being "Down." Hence, information regarding the lower level program is propagated vertically to the higher level. Similarly, and referring to FIG. 6B, when the S-LinkConnection status is indicated to be Down, then the S-ConnectionPath status is indicated to be "Down." Finally, and referring to FIG. 6A, when the S-ConnectionPath status is indicated to be Down, the service (L2VPN, VPLS, etc.) is also impacted and indicated to be "Down."

In another aspect of the invention, the information in the exemplary impact analysis diagrams shown in FIGS. 6A-6E may be interpreted as causality diagrams that allow for the determination of a cause for the generation of the Service being indicated to be "Down." Root-cause analysis and similar analysis using causality diagrams are well-known in the art. See for example, the commonly-owned U.S. patent Ser. No. 11/494,250, and U.S. Pat. Nos. 5,528,516; 5,661,668; 6,249,755; 6,868,367; 7,003,433 and 7,107,185, the contents of which are incorporated by reference herein. These patents and patent applications describe performing a system analysis based on a mapping of observable events and detectable events, e.g., symptoms and problems, respectively, in IP-based networks. Although the present invention has been shown and described with regard to an impact and root-cause analysis, other forms of analysis may also be performed with regard to the networks represented. These forms of analysis may include, but are not limited to, design, simulation, operations management, event propagation, impact analysis, root-cause analysis of problems, "what if" scenarios, projections and others. Similarly, while the analysis has been shown with regard to MPLS networks and VPNs, the MPLS and VPN models shown herein can be used individually or in combination to determine behavior relationships and perform analysis.

As would be recognized embodiments of the present application disclosed herein include software programs to implement the embodiment and operations disclosed herein. For example, a computer program product including a computer-readable medium encoded with computer program logic (software in a preferred embodiment). The logic is configured to allow a computer system to execute the functionality described above. One skilled in the art will recognize that the functionality described may also be loaded into conventional computer memory and executed by a conventional CPU. The implementations of this invention may take the form, at least partially, of program code (i.e., instructions) embodied in tangible media, such as floppy diskettes, CD-ROMs, hard drives, random access or read only-memory, or any other machine-readable storage medium or downloaded from one or more network connections. When the program code is loaded into and executed by a machine, such as a computer, the machine becomes an apparatus for practicing the invention. The implementations of the present invention may also be embodied in the form of program code that is transmitted over some transmission medium, such as over electrical wiring or cabling, through fiber optics, or via any other form of transmission. This may be implemented so that when the program code is received and loaded into and executed by a machine, such as a computer, the machine becomes an apparatus for practicing the invention. When executed in a computer's memory by a processing unit, the functionality or processes described herein reconfigures a general purpose digital computer into a special purpose digital computer enabled for implementing the functionality discussed herein. When implemented on a general-purpose processor, the program code combines with the processor of the computer to provide a unique apparatus that operates analogously to specific logic circuits.

One more particular embodiment of the present application is directed to a computer program product that includes a computer readable medium having instructions stored thereon for supporting management and viewing of configurations associated with a storage area network. The instructions, when carried out by a processor of a respective computer device, cause the processor to facilitate application deployment configuration.

Figure 7:
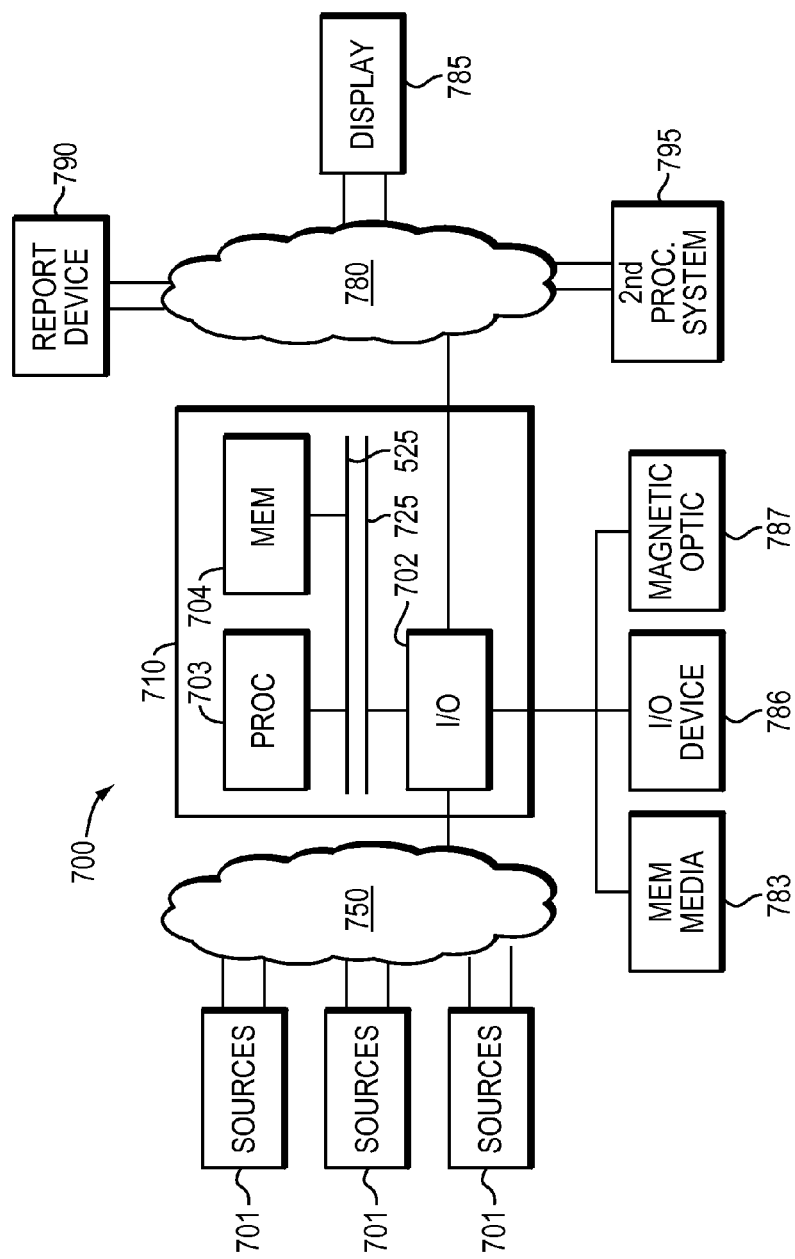
FIG. 7 illustrates a system implementing the processing shown herein.

FIG. 7 illustrates an exemplary embodiment of a system 700 that may be used for implementing the principles of the present invention. System 700 may contain one or more input/output devices 702, processors 703 and memories 704. I/O devices 702 may access or receive information from one or more devices 701, which represent sources of information. Sources or devices 701 may be devices such as routers, servers, computers, notebook computer, PDAs, cells phones or other devices suitable for transmitting and receiving information responsive to the processes shown herein. Devices 701 may have access over one or more network connections 750 via, for example, a wireless wide area network, a wireless metropolitan area network, a wireless local area network, a terrestrial broadcast system (Radio, TV), a satellite network, a cell phone or a wireless telephone network, or similar wired networks, such as POTS, INTERNET, LAN, WAN and/or private networks, e.g., INTRANET, as well as portions or combinations of these and other types of networks.

Input/output devices 702, processors 703 and memories 704 may communicate over a communication medium 725. Communication medium 725 may represent, for example, a bus, a communication network, one or more internal connections of a circuit, circuit card or other apparatus, as well as portions and combinations of these and other communication media. Input data from the sources or client devices 701 is processed in accordance with one or more programs that may be stored in memories 704 and executed by processors 703. Memories 704 may be any magnetic, optical or semiconductor medium that is loadable and retains information either permanently, e.g. PROM, or non-permanently, e.g., RAM. Processors 703 may be any means, such as general purpose or special purpose computing system, such as a laptop computer, desktop computer, a server, handheld computer, or may be a hardware configuration, such as dedicated logic circuit, or integrated circuit. Processors 703 may also be Programmable Array Logic (PAL), or Application Specific Integrated Circuit (ASIC), etc., which may be "programmed" to include software instructions or code that provides a known output in response to known inputs. In one aspect, hardware circuitry may be used in place of, or in combination with, software instructions to implement the invention. The elements illustrated herein may also be implemented as discrete hardware elements that are operable to perform the operations shown using coded logical operations or by executing hardware executable code.

In one aspect, the processes shown herein may be represented by computer readable code stored on a computer readable medium. The code may also be stored in the memory 704. The code may be read or downloaded from a memory medium 783, an I/O device 786 or magnetic or optical media, such as a floppy disk, a CD-ROM or a DVD, 787 and then stored in memory 704. Similarly the code may be downloaded over one or more networks, e.g., 750, 780, or not shown via I/O device 786, for example, for execution by processor 703 or stored in memory 704 and then accessed by processor 703. As would be appreciated, the code may be processor-dependent or processor-independent. JAVA is an example of processor-independent code. JAVA is a trademark of the Sun Microsystems, Inc., Santa Clara, Calif. USA.

Information from device 701 received by I/O device 702, after processing in accordance with one or more software programs operable to perform the functions illustrated herein, may also be transmitted over network 780 to one or more output devices represented as display 785, reporting device 790 or second processing system 795.

As one skilled in the art would recognize, the term computer or computer system may represent one or more processing units in communication with one or more memory units and other devices, e.g., peripherals, connected electronically to and communicating with the at least one processing unit. Furthermore, the devices may be electronically connected to the one or more processing units via internal busses, e.g., ISA bus, microchannel bus, PCI bus, PCMCIA bus, etc., or one or more internal connections of a circuit, circuit card or other device, as well as portions and combinations of these and other communication media or an external network, e.g., the Internet and Intranet.

While there has been shown, described, and pointed out fundamental novel features of the present invention as applied to preferred embodiments thereof, it will be understood that various omissions and substitutions and changes in the apparatus described, in the form and details of the devices disclosed, and in their operation, may be made by those skilled in the art without departing from the spirit of the present invention. It would be recognized that the invention is not limited by the model discussed, and used as an example, or the specific proposed modeling approach described herein. For example, it would be recognized that the method described herein may be used to perform a system analysis may include: fault detection, fault monitoring, performance, congestion, connectivity, interface failure, node failure, link failure, routing protocol error, routing control errors, and root-cause analysis.

It is expressly intended that all combinations of those elements that perform substantially the same function in substantially the same way to achieve the same results are within the scope of the invention. Substitutions of elements from one described embodiment to another are also fully intended and contemplated.

What is claimed is:

1. A computer-implemented method for logically representing and analyzing a Virtual Private Network (VPN), the method comprising the steps of:
    representing, using one or more processors, a set of high level functionality layers corresponding to the VPN without having specific knowledge of the underlying physical and logical components of an Open Systems Interconnection (OSI) stack in the VPN, the set of high level functionality layers including a first functionality layer and a second functionality layer, the first functionality layer having representations of a first plurality of configuration non-specific objects corresponding to a first selection of underlying physical and logical components of the VPN, the second functionality layer having representations of a second plurality of configuration non-specific objects corresponding to a second selection of underlying physical and logical components of the VPN, at least one of the first plurality of configuration non-specific objects and at least one of the second plurality of configuration non-specific objects capable of representing objects from multiple layers of the OSI stack to enable analysis of the OSI stack of the VPN based on the first and the second functionality layers;
    organizing selected ones of the first and second plurality of configuration non-specific objects within selected ones of the first and second functionality layers among the set of high level functionality layers, wherein the first and second plurality of configuration non-specific objects are selected from the group consisting of: VPNService, ServiceConnectionPath, ForwarderEndpoint, TunnelGroup, Tunnel, TunnelHop, TunnelIn/Out, SignalingProtocolEndpoint, SignalingProtocolSession and SignalingProtocolService; and
    representing relationships among the first and second selections of physical and logical components as configuration non-specific representations within and among the first and second functionality layers, wherein Endpoint objects provide communication among the first and second functionality layers.

2. The method as recited in claim 1, wherein a functional layer of the set of high level functionality layers is selected from the group consisting of Service Layer, Service Construct Layer, Transport Layer, and Control Plane Layer.

3. The method as recited in claim 1, further comprising the step of:
    analyzing properties of the VPN based on a behavior relationship.

4. The method as recited in claim 3, wherein the step of analyzing comprises the steps of:
    providing a mapping between a plurality of observable events and a plurality of causing events occurring in the selected ones of the first and second plurality of configuration non-specific objects within the selected ones of the first and second functionality layers;
    determining at least one causing event based on at least one of the plurality of observable events within the selected ones of the first and second functionality layers; and
    providing the at least one causing event to be propagated to a next layer through the Endpoint objects.

5. The method as recited in claim 4, wherein the step of determining at least one causing event, comprises the step of;
    determining a measure between each of a plurality of values associated with the plurality of observable events and the plurality of causing events at least one functionality layer.

6. The method as recited in claim 3, wherein the analysis is selected from the group consisting of: impact, root-cause, exception detection, provisioning, configuration, study, performance, costing, capacity planning, design, "what if" scenarios, planning and simulation.

7. The method as recited in claim 6, further comprising the step of:
    storing the results of the selected analysis.

8. The method as recited in claim 6, further comprising the step of:
    displaying the results of the selected analysis.

9. The method as recited in claim 1, wherein a behavioral relationship is Layeredover/underlying.

10. The method as recited in claim 9, wherein the behavioral relationship is recursive.

11. The method as recited in claim 1, wherein the step of representing the relationships comprises the step of:
    propagating a property or attribute of an object through at least one associated representation of a relationship among associated object classes within or among the set of high level functionality layers.

12. An apparatus for logically representing and analyzing a Virtual Private Network (VPN), the apparatus comprising:
    a processor in communication with a memory, the processor executing code for:
        representing, using the processor, a set of high level functionality layers corresponding to the VPN without having specific knowledge of the underlying physical and logical components of an Open Systems Interconnection (OSI) stack in the VPN, the set of high level functionality layers including a first functionality layer and a second functionality layer, the first functionality layer having representations of a first plurality of configuration non-specific objects corresponding to a first selection of underlying physical and logical components of the VPN, the second functionality layer having representations of a second plurality of configuration non-specific objects corresponding to a second selection of underlying physical and logical components of the VPN, at least one of the first plurality of configuration non-specific objects and at least one of the second plurality of configuration non-specific objects capable of representing objects from multiple layers of the OSI stack to enable analysis of the OSI stack of the VPN based on the first and the second functionality layers;

organizing selected ones of the first and second plurality of configuration non-specific objects within selected ones of the first and second functionality layers among the set of high level functionality layers, wherein the first and second plurality of configuration non-specific objects are selected from the group consisting of: VPNService, ServiceConnectionPath, ForwarderEndpoint, TunnelGroup, Tunnel, TunnelHop, TunnelIn/Out, SignalingProtocolEndpoint, SignalingProtocolSession and Signaling ProtocolService; and representing relationships among the first and second selections of physical and logical components as configuration non-specific representations within and among said the first and second functionality layers, wherein Endpoint objects provide communication among the first and second functionality layers.

13. The apparatus as recited in claim 12, wherein a functional layer of the set of high level functionality layers is selected from the group consisting of Service Layer, Service Construct Layer, Transport Layer, and Control Plane Layer.

14. The apparatus as recited in claim 12, wherein the processor further executed code for:
analyzing properties of the VPN based on a behavior relationship.

15. The apparatus as recited in claim 14, wherein the step of analyzing comprises the steps of:
providing a mapping between a plurality of observable events and a plurality of causing events occurring in the selected ones of the first and second plurality of configuration non-specific objects within the selected ones of the first and second functionality layers;
determining at least one causing event based on at least one of the plurality of observable events within the selected ones of the first and second functionality layers; and
providing the at least one causing event to be propagated to a next layer through the Endpoint objects.

16. The apparatus as recited in claim 15, wherein the step of determining at least one causing event, comprises the step of;
determining a measure between each of a plurality of values associated with the plurality of observable events and the plurality of causing events at least one functionality layer.

17. The apparatus as recited in claim 14, wherein the analysis is selected from the group consisting of: impact, root-cause, exception detection, provisioning, configuration, study, performance, costing, capacity planning, design, "what if" scenarios, planning and simulation.

18. The apparatus as recited in claim 17, the processor further executing code for:
storing the results of the selected analysis.

19. The apparatus as recited in claim 17, the processor further executing code for:
displaying the results of the selected analysis.

20. The apparatus as recited in claim 12, wherein a behavioral relationship is Layeredover/underlying.

21. The apparatus as recited in claim 20, wherein the behavioral relationship is recursive.

22. The apparatus as recited in claim 12, wherein the step of representing the relationships comprises the step of:
propagating a property or attribute of an object through at least one associated representation of a relationship among associated object classes within or among the set of high level functionality layers.

23. A computer-program product stored on a non-transitory computer readable medium, providing computer code executed by a computer for logically representing and analyzing a Virtual Private Network (VPN), the computer code, when loaded into a processing system, executing the steps of:
representing, using one or more processors, a set of high level functionality layers corresponding to the VPN without having specific knowledge of the underlying physical and logical components of an Open Systems Interconnection (OSI) stack in the VPN, the set of high level functionality layers including a first functionality layer and a second functionality layer, the first functionality layer having representations of a first plurality of configuration non-specific objects corresponding to a first selection of underlying physical and logical components of the VPN, the second functionality layer having representations of a second plurality of configuration non-specific objects corresponding to a second selection of underlying physical and logical components of the VPN, at least one of the first plurality of configuration non-specific objects and at least one of the second plurality of configuration non-specific objects capable of representing objects from multiple layers of the OSI stack to enable analysis of the OSI stack of the VPN based on the first and the second functionality layers;
organizing selected ones of the first and second plurality of configuration non-specific objects within selected ones of the first and second functionality layers among the set of high level functionality layers, wherein the first and second plurality of configuration non-specific objects are selected from the group consisting of: VPNService, ServiceConnectionPath, ForwarderEndpoint, TunnelGroup, Tunnel, TunnelHop, TunnelIn/Out, SignalingProtocolEndpoint, SignalingProtocolSession and SignalingProtocolService; and
representing relationships among the first and second selections of physical and logical components as configuration non-specific representations within and among the first and second functionality layers, wherein Endpoint objects provide communication among the first and second functionality layers.

24. The computer-program product as recited in claim 23, wherein a functional layer of the set of high level functionality layers is selected from the group consisting of Service Layer, Service Construct Layer, Transport Layer, and Control Plane Layer.

25. The computer-program product as recited in claim 23, wherein the computer code further executing the step of:
analyzing properties of the VPN based on a behavior relationship.

26. The computer-program product as recited in claim 25, wherein the step of analyzing comprises the steps of:
providing a mapping between a plurality of observable events and a plurality of causing events occurring in the selected ones of the first and second plurality of configuration non-specific objects within the selected ones of the first and second functionality layers;
determining at least one causing event based on at least one of the plurality of observable events within the selected ones of the first and second functionality layers; and
providing the at least one causing event to be propagated to a next layer through the Endpoint objects.

27. The computer-program product as recited in claim 26, wherein the step of determining at least one causing event, comprises the step of;
determining a measure between each of a plurality of values associated with the plurality of observable events and the plurality of causing events at least one functionality layer.

28. The computer-program product as recited in claim 25, wherein the analysis is selected from the group consisting of: impact, root-cause, exception detection, provisioning, configuration, study, performance, costing, capacity planning, design, "what if" scenarios, planning and simulation.

29. The computer-program product as recited in claim 28, the computer code further executing the step of:
   storing the results of the selected analysis.

30. The computer-program product as recited in claim 28, the computer code further executing the step of:
   displaying the results of the selected analysis.

31. The computer-program product as recited in claim 23, wherein a behavioral relationship is Layeredover/underlying.

32. The computer-program product as recited in claim 31, wherein the behavioral relationship is recursive.

33. The computer-program product as recited in claim 23, wherein the step of representing the relationships comprises the step of:
   propagating a property or attribute of an object through at least one associated representation of a relationship among associated object classes within or among the set of high level functionality layers.

* * * * *